United States Patent
Tada

(10) Patent No.: US 8,546,014 B2
(45) Date of Patent: Oct. 1, 2013

(54) BATTERY CHAMBER, ELECTRONIC DEVICE HAVING THE BATTERY CHAMBER, AND IMAGING DEVICE HAVING THE BATTERY CHAMBER

(75) Inventor: Takashi Tada, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 358 days.

(21) Appl. No.: 12/981,003

(22) Filed: Dec. 29, 2010

(65) Prior Publication Data

US 2011/0177386 A1   Jul. 21, 2011

(30) Foreign Application Priority Data

Jan. 18, 2010   (JP) ................. 2010-007848

(51) Int. Cl.
 *H01M 2/04*   (2006.01)
 *H01M 2/02*   (2006.01)
(52) U.S. Cl.
 USPC .......................................... 429/176; 429/178
(58) Field of Classification Search
 USPC ................................. 429/176, 178
 See application file for complete search history.

(56) References Cited

FOREIGN PATENT DOCUMENTS

| JP | 2002-373632 | 12/2002 |
| JP | 2002373632 A | * 12/2002 |
| JP | 2007-273486 | 10/2007 |

* cited by examiner

*Primary Examiner* — Karie O'Neill Apicella
(74) *Attorney, Agent, or Firm* — Oblon, Spivak, McClelland, Maier & Neustadt, L.L.P.

(57) ABSTRACT

A battery chamber includes: a claw mechanism for a battery including: a movable member that is movable in insertion and removal directions of a battery, and abuts a front face of the battery in the insertion direction when the battery is inserted and completely loaded; an urging member that urges the movable member in the removal direction; and a stopper having: a locking claw that locks a back face of the battery from behind in the insertion direction when the battery is completely loaded, wherein in a case where the battery is inserted, and the movable member is pressed and moved in the insertion direction by the battery, and then an interval in the insertion direction between the movable member and the locking claw becomes a length of the battery in the insertion direction, the locking claw moves from an evacuation position of the locking claw where the locking claw does not interfere with the battery when the battery is inserted to a locking position of the locking claw where the locking claw locks the back face of the battery from behind in the insertion direction when the battery is completely loaded.

9 Claims, 13 Drawing Sheets

BATTERY CHAMBER, ELECTRONIC DEVICE HAVING THE BATTERY CHAMBER, AND IMAGING DEVICE HAVING THE BATTERY CHAMBER

CROSS REFERENCE TO RELATED APPLICATION

The present application is based on and claims priority from Japanese patent application number 2010-007848, filed Jan. 18, 2010, the disclosures of which is hereby incorporated by reference herein in its entirety.

BACKGROUND

The present invention relates to a battery chamber that is capable of loading different kinds of batteries.

Usually, an electronic device driven by a battery has a battery chamber to load the battery.

And generally, a usable battery for one electronic device is limited to one kind, therefore an internal shape of the battery chamber that the electronic device has is designed corresponding to an external shape of a battery that is loaded to the electronic device.

Accordingly, conventionally, if batteries have the same output voltage but the internal shape of the battery chamber of the electronic device and external shapes of the batteries are slightly different, the batteries are not usable for the electronic device.

Japanese patent application publication number 2002-373632 discloses a battery chamber that makes it possible to load batteries having slightly different sizes and shapes and achieve a stable electrical contact.

Japanese patent application publication number 2002-373632 discloses that two kinds of batteries, each of which has slightly different length (height) in an insertion direction of a battery chamber and a slightly different external shape of a side part, are loadable in the battery chamber.

In Japanese patent application publication number 2002-373632, in accordance with a difference of the external shape of the side part of each of the batteries (based on whether each of the batteries has an uneven part on the side part or not), batteries having different lengths in the insertion direction (batteries having different heights) are accepted by moving an electrical terminal provided in the battery chamber in the insertion direction.

However, as described above, in Japanese patent application publication number 2002-373632, in accordance with the difference of the external shape of the side part of each of the batteries, the electrical terminal provided in the battery chamber is moved in the insertion direction, and therefore if a battery has no difference in the external shape of the side part (if there is no uneven part on the side part of the battery), the battery is not acceptable.

SUMMARY

An object of the present invention is to provide a battery chamber which is capable of loading a plurality of kinds of batteries having different heights, regardless of an external shape of a side part of a battery.

To achieve the above object, the embodiment of the present invention provides a battery chamber comprising: a claw mechanism for a battery including: a movable member that is movable in insertion and removal directions of a battery, and abuts a front face of the battery in the insertion direction when the battery is inserted and completely loaded; an urging member that urges the movable member in the removal direction; and a stopper having: a locking claw that locks a back face of the battery from behind in the insertion direction when the battery is completely loaded, wherein in a case where the battery is inserted, and the movable member is pressed and moved in the insertion direction by the battery, and then an interval in the insertion direction between the movable member and the locking claw becomes a length of the battery in the insertion direction, the locking claw moves from an evacuation position of the locking claw where the locking claw does not interfere with the battery when the battery is inserted to a locking position of the locking claw where the locking claw locks the back face of the battery from behind in the insertion direction when the battery is completely loaded.

DETAILED DESCRIPTION OF THE PREFERRED EMBODIMENT

Figure 1:
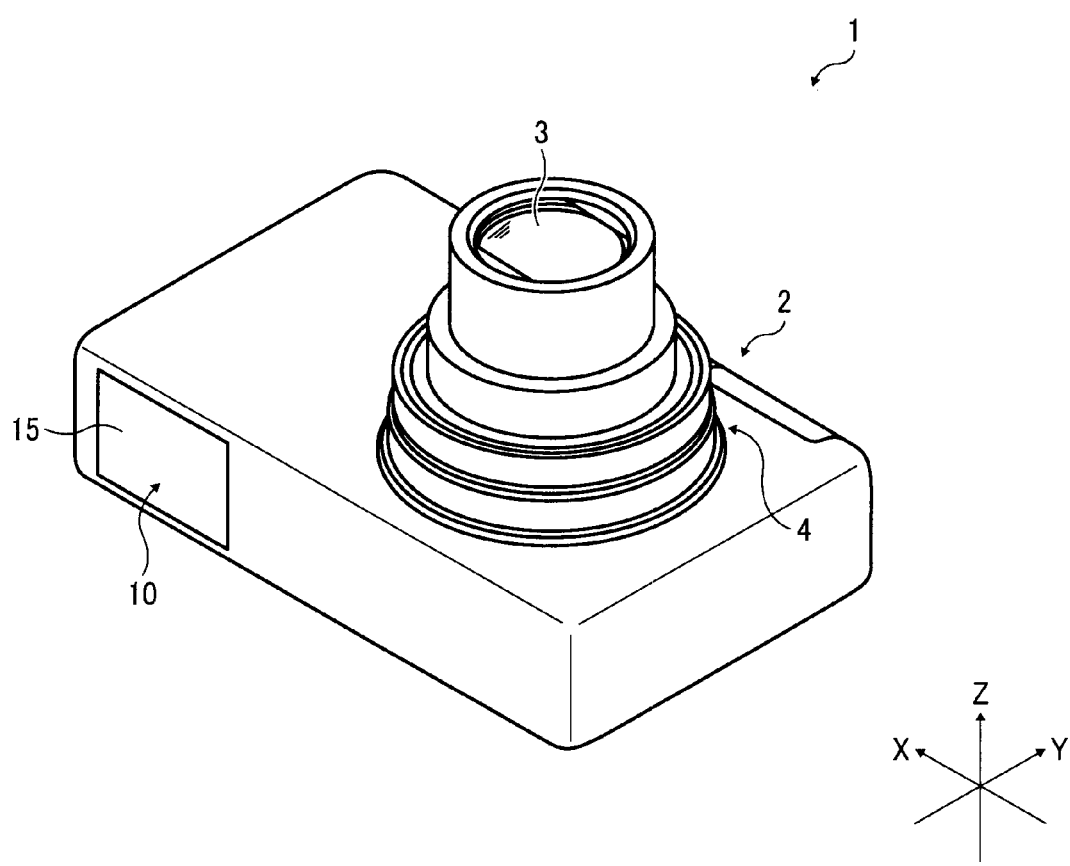
FIG. 1 is a front view of a digital camera 1 as an example of an imaging device (electronic device) having a battery chamber 10 according to an embodiment of the present invention.

Hereinafter, with reference to FIGS. 1 to 10, the present embodiment according to the present invention will be explained. In FIG. 3, a projection 25 for a spring and a torsion spring 26 are omitted.
Embodiment A digital camera 1 as an example of an electronic device is provided with a battery chamber 10 according to the present embodiment, as illustrated in FIG. 1. The digital camera 1 has a lens barrel 4 including a shooting lens system 3 as a shooting optical system on the front side of a camera body 2, and an image sensor (not illustrated) obtains an image via the shooting lens system 3. In the digital camera 1, electric power is supplied from a battery 11 (see FIGS. 8C and 9E) loaded in the battery chamber 10 to a main circuit board 5 (see FIG. 4) and thereby a shooting operation and so on can be executed. A constitution, operations, and so on of the digital camera 1 do not directly relate to the embodiment of the present invention, therefore detailed explanations will be omitted here. In the following explanation, an optical axis direction of the shooting optical system (shooting lens system 3) is defined as a direction of thickness of the camera body 2 or a z-axis direction. A vertical direction in a normal usage state of the digital camera 1 is defined as a direction of height of the camera body 2 or a y-axis direction. And a direction perpendicular to those two above is defined as a direction of width or an x-axis direction. Here, a positive side in the z-axis direction is defined as a front side (front) of a camera, and a negative side in the z-axis direction is defined as a back side (back) of the camera. A positive side in the y-axis direction is defined as an upper side of the camera, a positive y-axis direction is defined as an insertion direction of a battery, a negative side in the y-axis direction is defined as a lower side of the camera, and a negative y-axis direction is defined as a removal direction of the battery. A front side in the x-axis direction is defined as a right side seen from the back side of the camera, and a negative side in the x-axis direction is defined as a left side seen from the back side of the camera.

Figure 2:
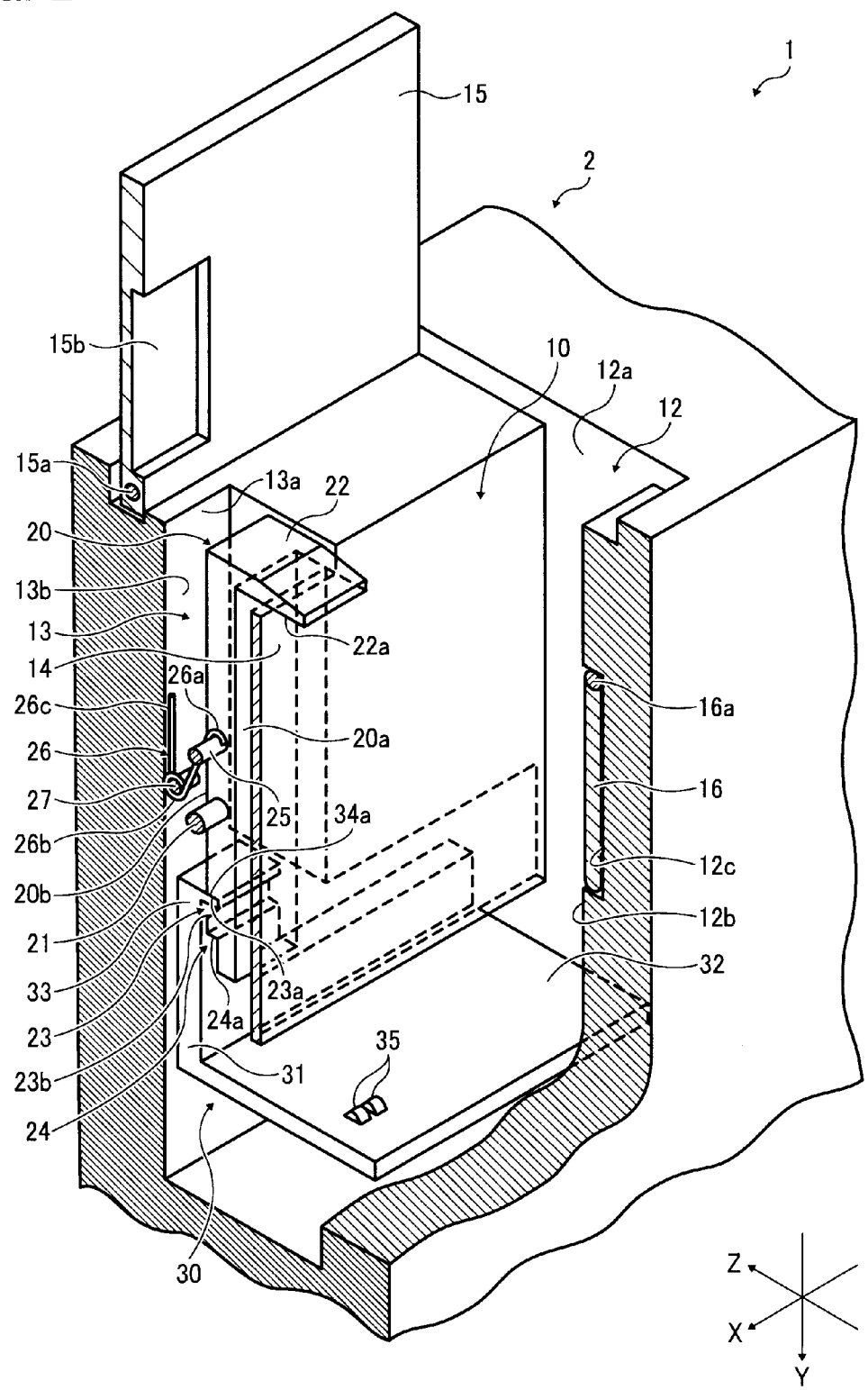
FIG. 2 is a schematic perspective view illustrating a constitution of the battery chamber 10.
Figure 3:
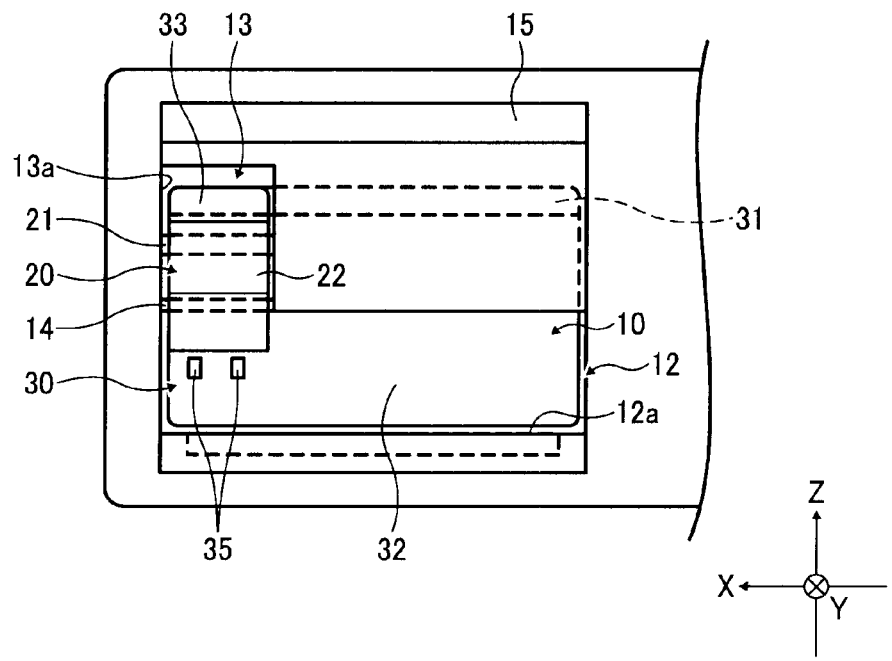
FIG. 3 is a schematic bottom view seen from a side of a battery cover 15 of battery chamber 10 of FIG. 2 (seen from a lower side in a normal usage state of the digital camera 1).
Figure 4:
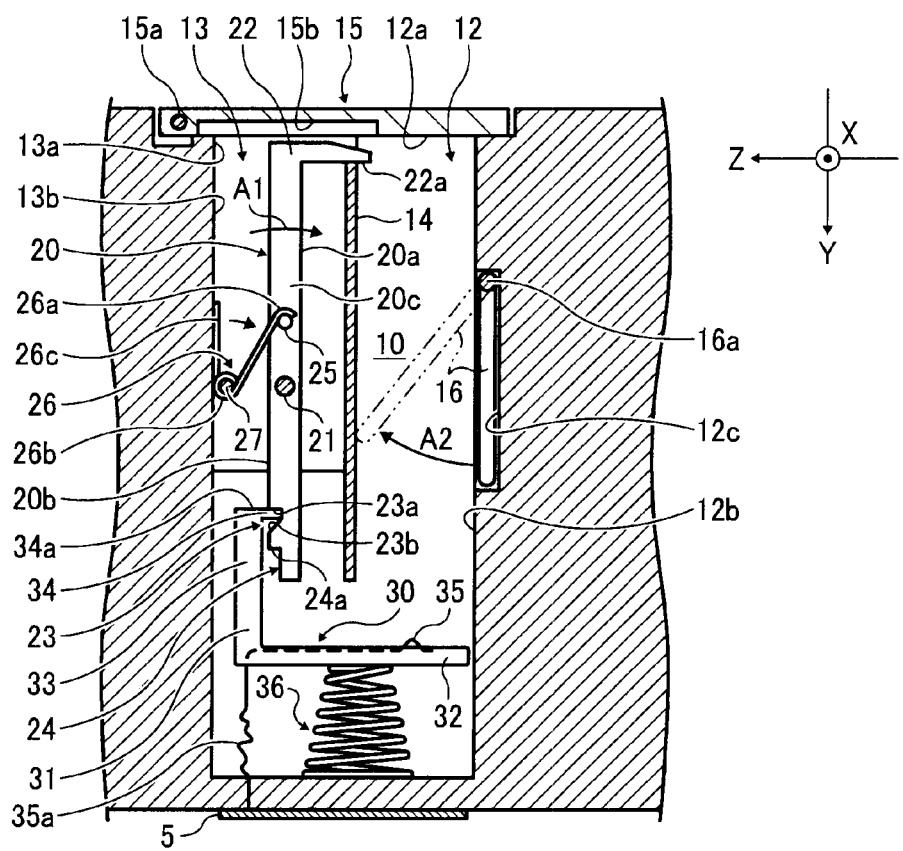
FIG. 4 is a schematic sectional view of the constitution of the battery chamber 10.

As illustrated in FIGS. 2 to 4, the camera body 2 includes a space 12 for a battery chamber and a space 13 for a claw mechanism that constitute the battery chamber 10. The space 12 for the battery chamber is entirely in the shape of a rectangular parallelepiped which extends in the direction of height (y-axis direction) from a bottom of the camera body 2, and there is an opening (12a) on the bottom of the camera body 2. The space 12 for the battery chamber constitutes the battery chamber 10 which is a space where the battery is actually loaded, in cooperation with a horizontal plate part 32 of a movable member 30 which are described later. Therefore, the opening of the space 12 for the battery chamber is a battery loading gate 12a to load the battery 11 in the battery chamber 10. As described above, an insertion direction to the battery chamber 10 of the battery 11 is the direction of height (positive y-axis direction) which is a direction where the battery chamber, that is, the space 12 for the battery chamber extends.

The space 13 for the claw mechanism is entirely in the shape of a rectangular parallelepiped which extends in the direction of height (y-axis direction) from the bottom of the camera body 2 and is smaller in width than that of the space 12 for the battery chamber, and there is an opening (13a) on the bottom of the camera body 2. The space 13 for the claw mechanism constitutes a claw mechanism as a claw mechanism for a battery (a locking lever 20, the movable member 30, and a coil spring 36, which are explained later) to lock each battery 11 inserted in the battery chamber. Therefore, the opening of the space 13 for the claw mechanism is an insertion gate 13a to expose a locking claw 22 of the locking lever 20.

The space 12 for the battery chamber and the space 13 for the claw mechanism are adjacent to each other with a sectional wall 14 in between in the direction of thickness (z-axis direction) seen from a side of the bottom (see FIG. 3), and communicate with each other at an upper side of the digital camera 1 in the normal usage state (positive side in the y-axis direction).

A battery cover 15 as a cover member is capable of covering the battery loading gate 12a of the space 12 for the battery chamber and the insertion gate 13a of the space 13 for the claw mechanism. The battery cover 15 is entirely in the shape of a flat-plate, and is provided on the bottom of the camera body 2 via a rotating shaft 15a to open and close freely. And the battery cover 15 is capable of holding a covered state (closed state) (see FIG. 4) by a locking mechanism which is not illustrated. In the present embodiment, the battery cover 15 has a concave part 15b which allows the locking claw 22 to move by a rotation of the locking lever 20.

Figure 5A:
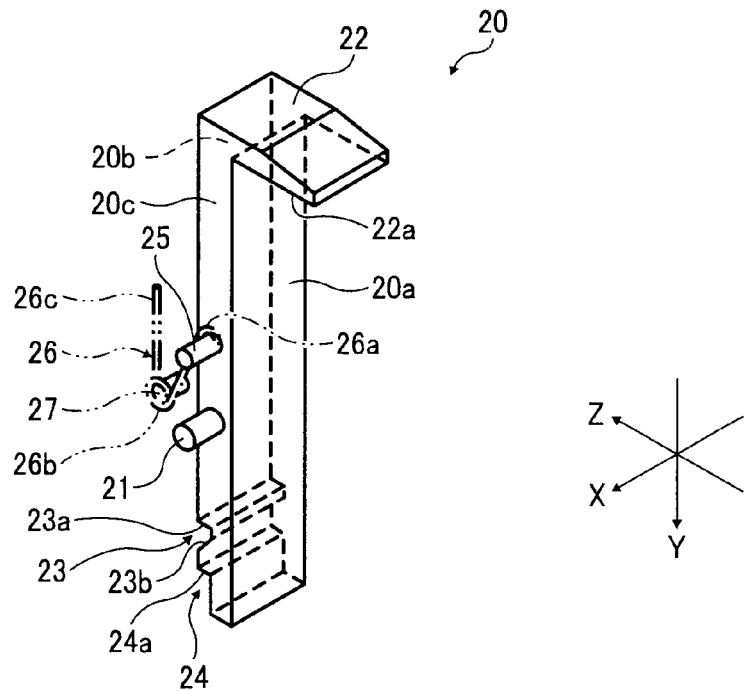
FIG. 5A is an explanatory view explaining a constitution of a locking lever 20 used for the battery chamber 10 and illustrated in a perspective view.
Figure 5B:
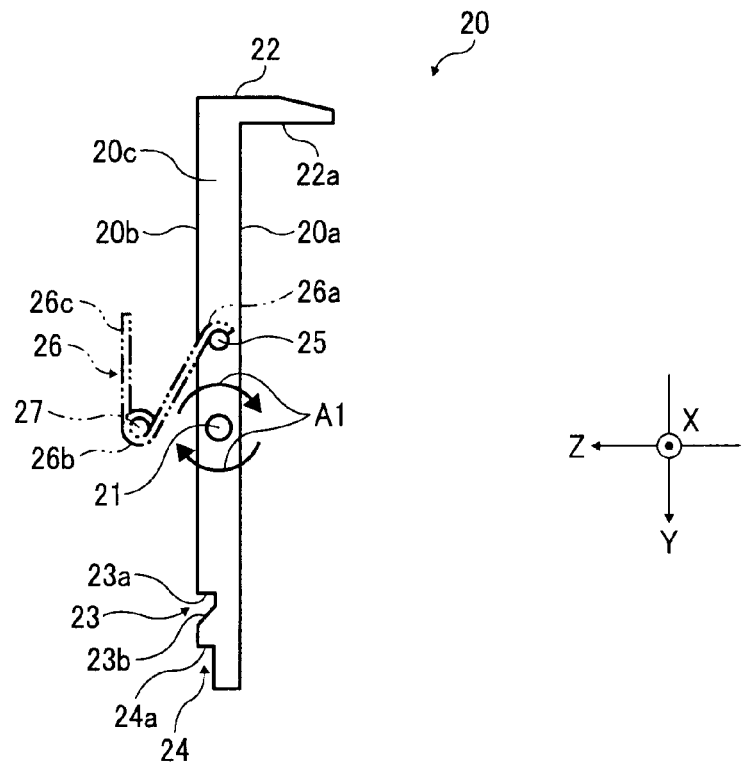
FIG. 5B is an explanatory view explaining the constitution of the locking lever 20 used for the battery chamber 10 and illustrated in a side view.

The locking lever 20 as a stopper and the movable member 30 are provided in the space 12 for the battery chamber and the space 13 for the claw mechanism. The locking lever 20 is entirely in the shape of a longitudinal plate, and is supported rotatably in the space 13 for the claw mechanism by a rotating shaft 21 which extends in the direction of width (x-axis direction) in the space 13 for the claw mechanism. The locking lever 20, as illustrated in FIGS. 5A and 5B, includes the locking claw 22 and a longitudinal plate part 20c. The locking claw 22 is formed at an end part of one side of the longitudinal plate part 20c of the locking lever 20 (a back end part of the longitudinal plate part 20c of the locking lever 20 in the insertion direction), and two engaging cut parts 23 and 24 are formed at the other side of the longitudinal plate part 20c of the locking lever 20 (a front part of the longitudinal plate part 20c of the locking lever 20 in the insertion direction), and the projection 25 for the spring is formed at a position closer to the end part of the one side of the longitudinal plate part 20c of the locking lever 20 than a position of the rotating shaft 21.

The locking claw 22 extends perpendicularly to a direction where the longitudinal plate part 20c of the locking lever 20 extends from a face of the longitudinal plate part 20c of the locking lever 20 at a side of the sectional wall 14 (hereinafter, the face is referred to as a front face 20a of the longitudinal plate part 20c of the locking lever 20).

The locking claw 22 has a locking face 22a which is flat, and the locking face 22a is formed at the other side of the locking claw 22 (a lower side of the locking claw 22 in FIGS. 5A and 5B).

The locking face 22a of the locking claw 22 abuts a back face 11d of the battery 11 inserted in the battery chamber 10 (a back face of the battery in the insertion direction) and locks the battery 11 to prevent the battery 11 from falling off the battery loading gate 12a, that is, to hold a loaded state of the battery 11.

Since the locking lever 20 is supported rotatably by the rotating shaft 21, in a state where the locking lever 20 stands along the direction of height (upright state), the locking claw 22 has a length such that an end part (locking face 22a) of the locking claw 22 is capable of positioning at an upper part of the space 12 for the battery chamber 10 over the sectional wall 14 from an upper part of the space 13 for the claw mechanism.

Figure 8A:
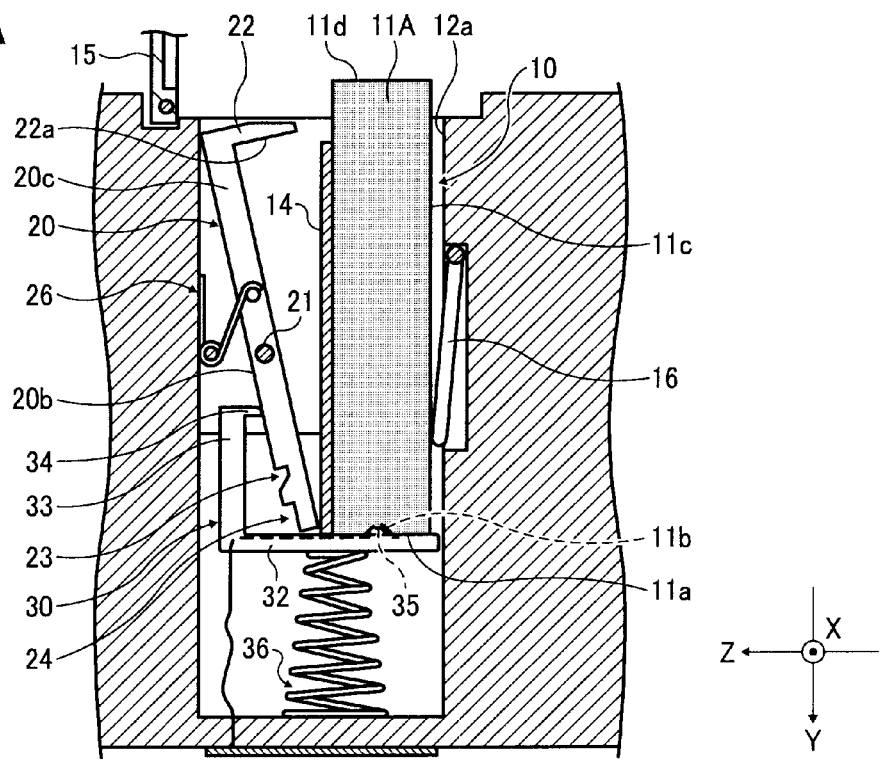
FIG. 8A is an explanatory view explaining a state where the battery 11A is loaded in the battery chamber 10 and illustrates a state where the battery 11A is inserted.
Figure 8B:
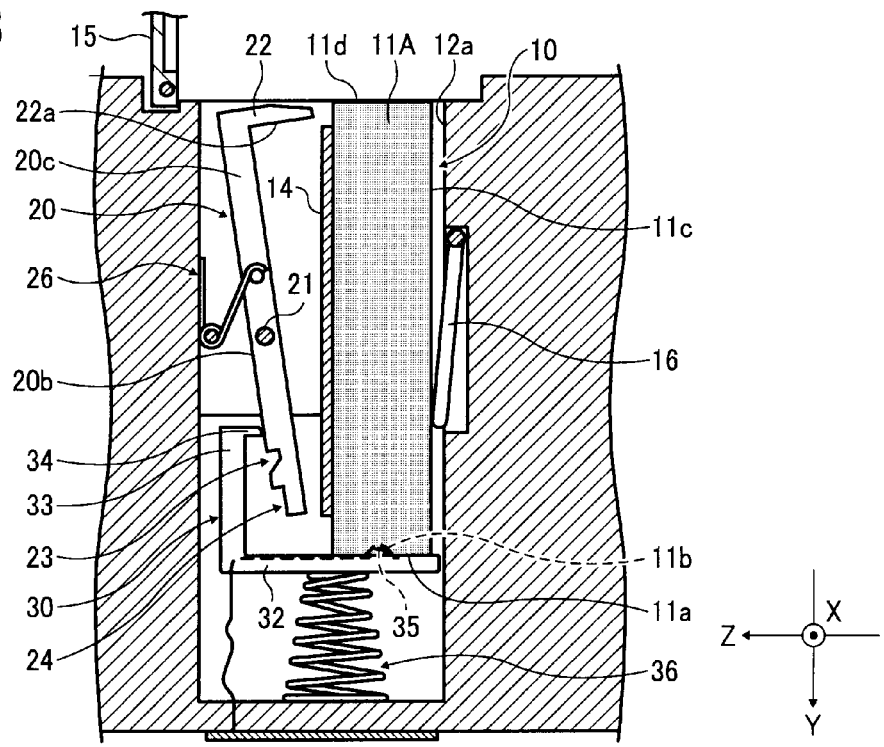
FIG. 8B is an explanatory view explaining the state where the battery 11A is loaded in the battery chamber 10 and illustrates a state where the battery 11A is pressed thereinto.
Figure 8C:
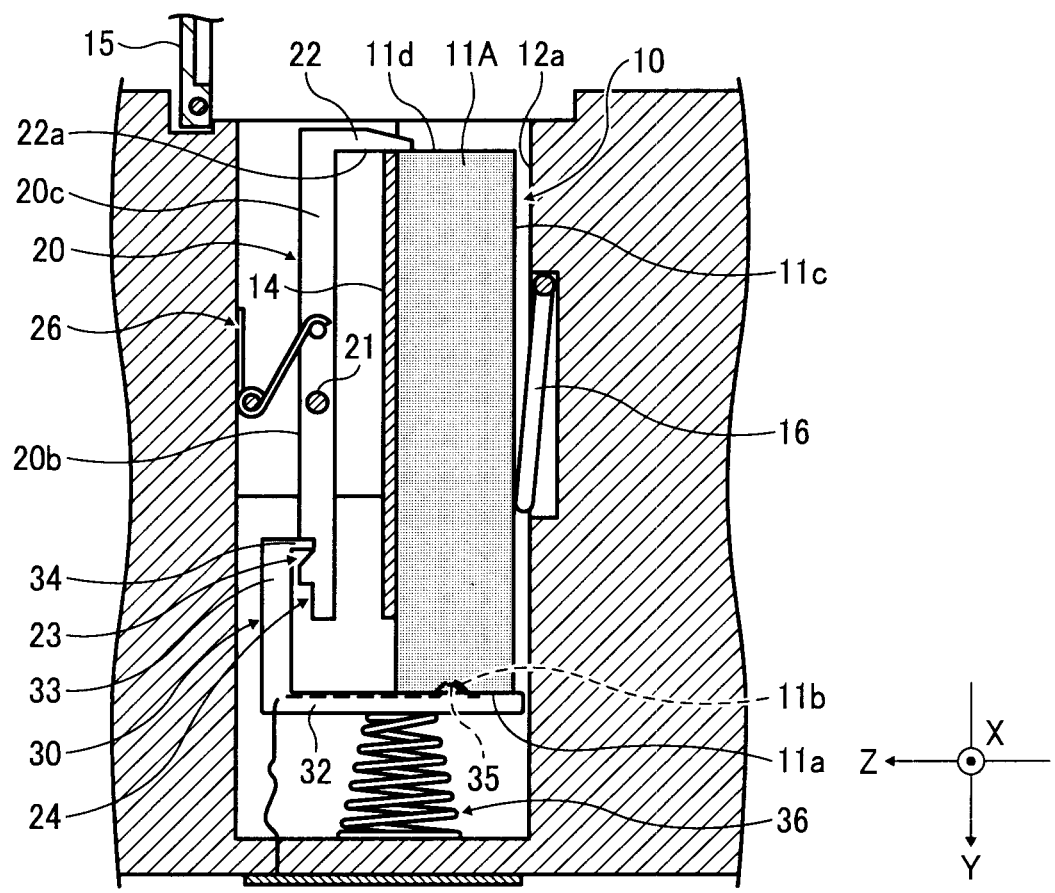
FIG. 8C is an explanatory view explaining the state where the battery 11A is loaded in the battery chamber 10 and illustrates a state where the depth has become the height of the battery 11A.
Figure 9A:
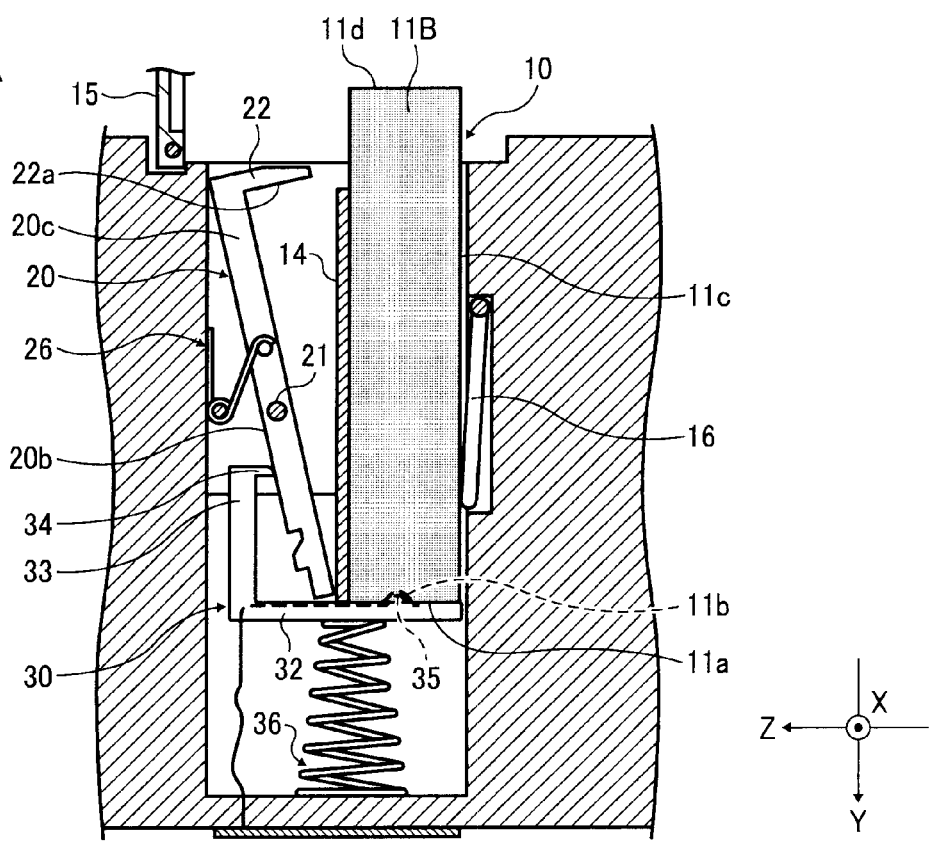
FIG. 9A is an explanatory view explaining a state where the battery 11B is loaded in the battery chamber 10 and illustrates a state where the battery 11B is inserted.
Figure 9B:
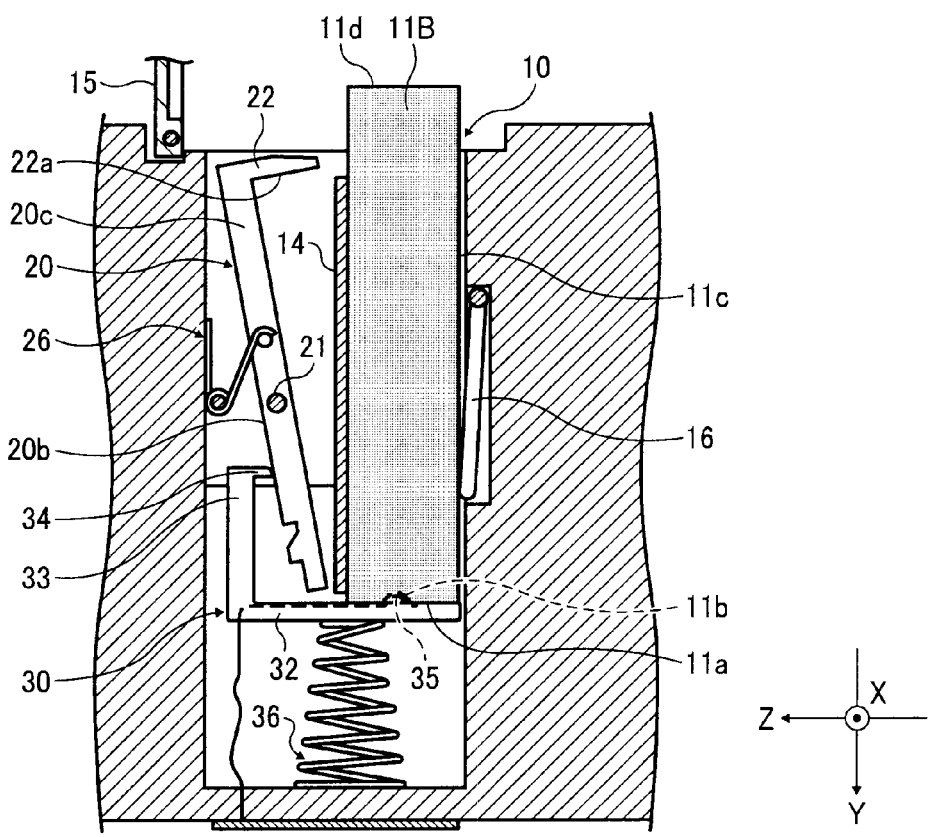
FIG. 9B is an explanatory view explaining the state where the battery 11B is loaded in the battery chamber 10 and illustrates a state where the battery 11B is pressed thereinto.
Figure 9C:
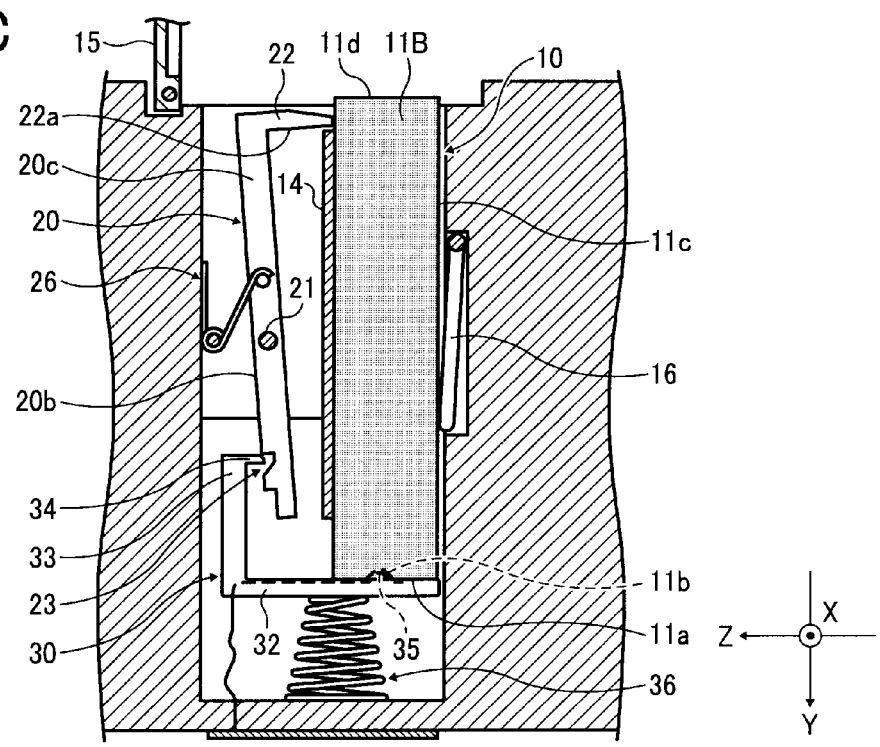
FIG. 9C is an explanatory view explaining the state where the battery 11B is loaded in the battery chamber 10 and illustrates a state where the depth has become the height of the battery 11A.
Figure 9D:
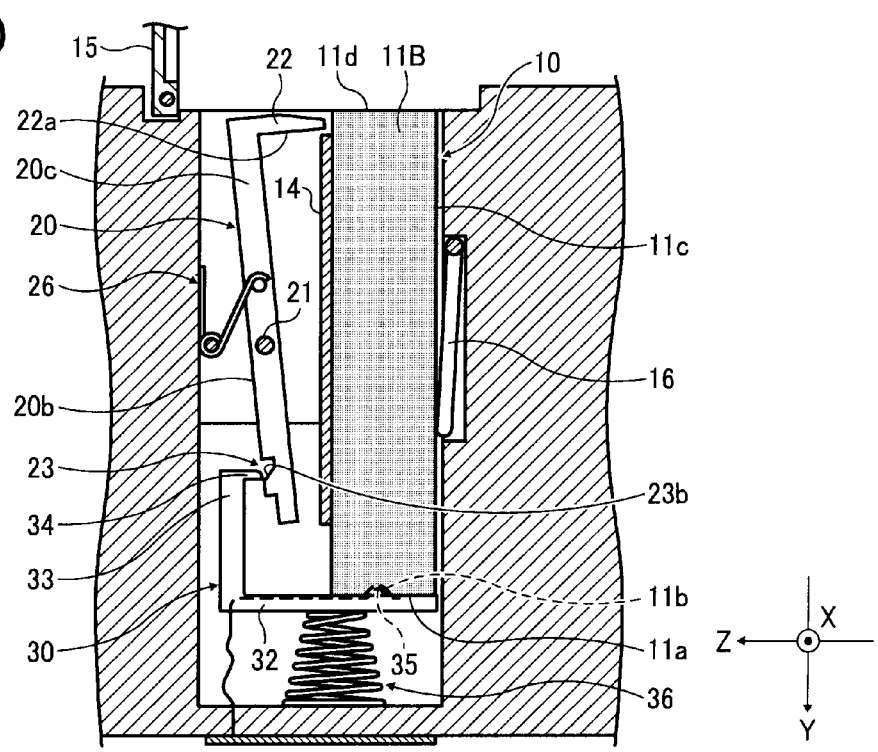
FIG. 9D is an explanatory view explaining the state where the battery 11B is loaded in the battery chamber 10 and illustrates a state where the battery 11B is further pressed.
Figure 9E:
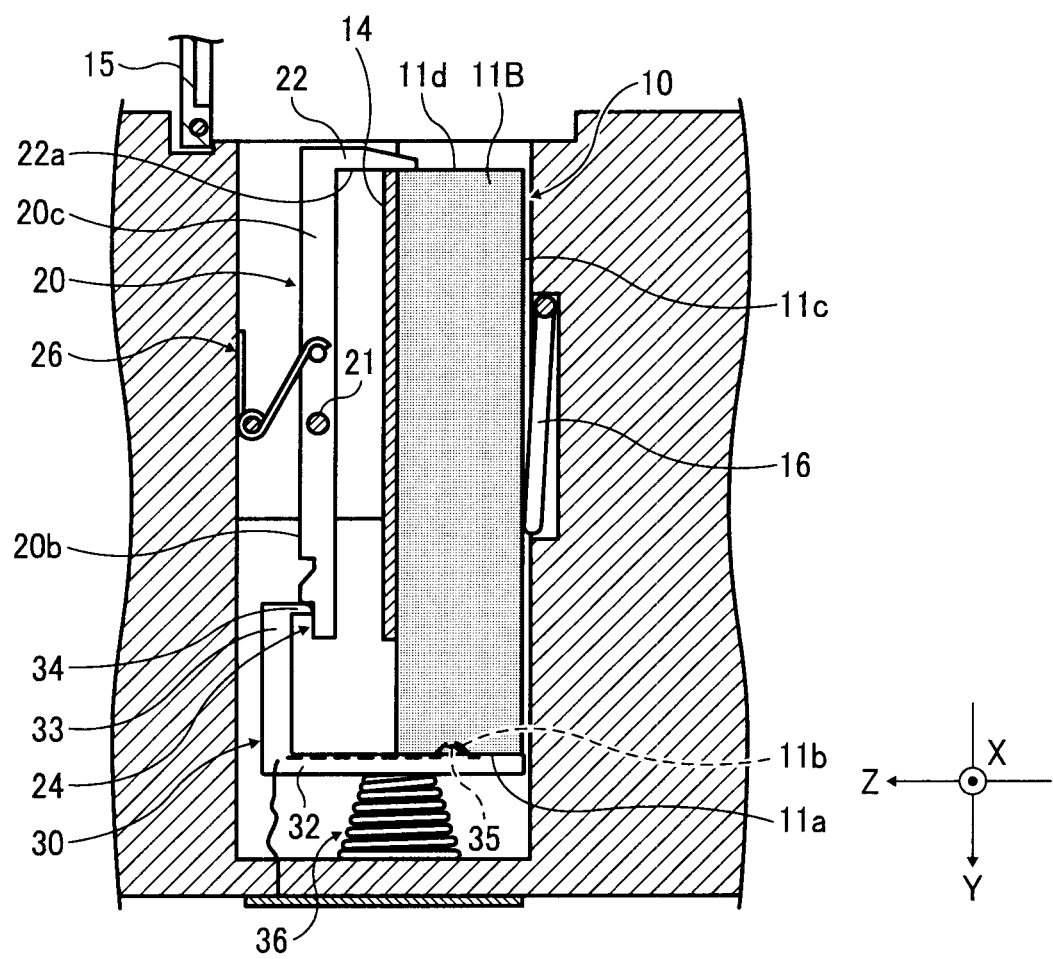
FIG. 9E is an explanatory view explaining the state where the battery 11B is loaded in the battery chamber 10 and illustrates a state where the depth has become the height of the battery 11B.

The end part (locking face 22a) of the locking claw 22 positions at the upper part of the space 12 for the battery chamber 10, and therefore it is possible to lock the back face 11d of the inserted battery 11 (see FIGS. 8C and 9E). Hereinafter, this position is defined as a locking position of the locking claw 22, and a state of the locking lever 20 at the time is defined as a locking state.

Figure 7:
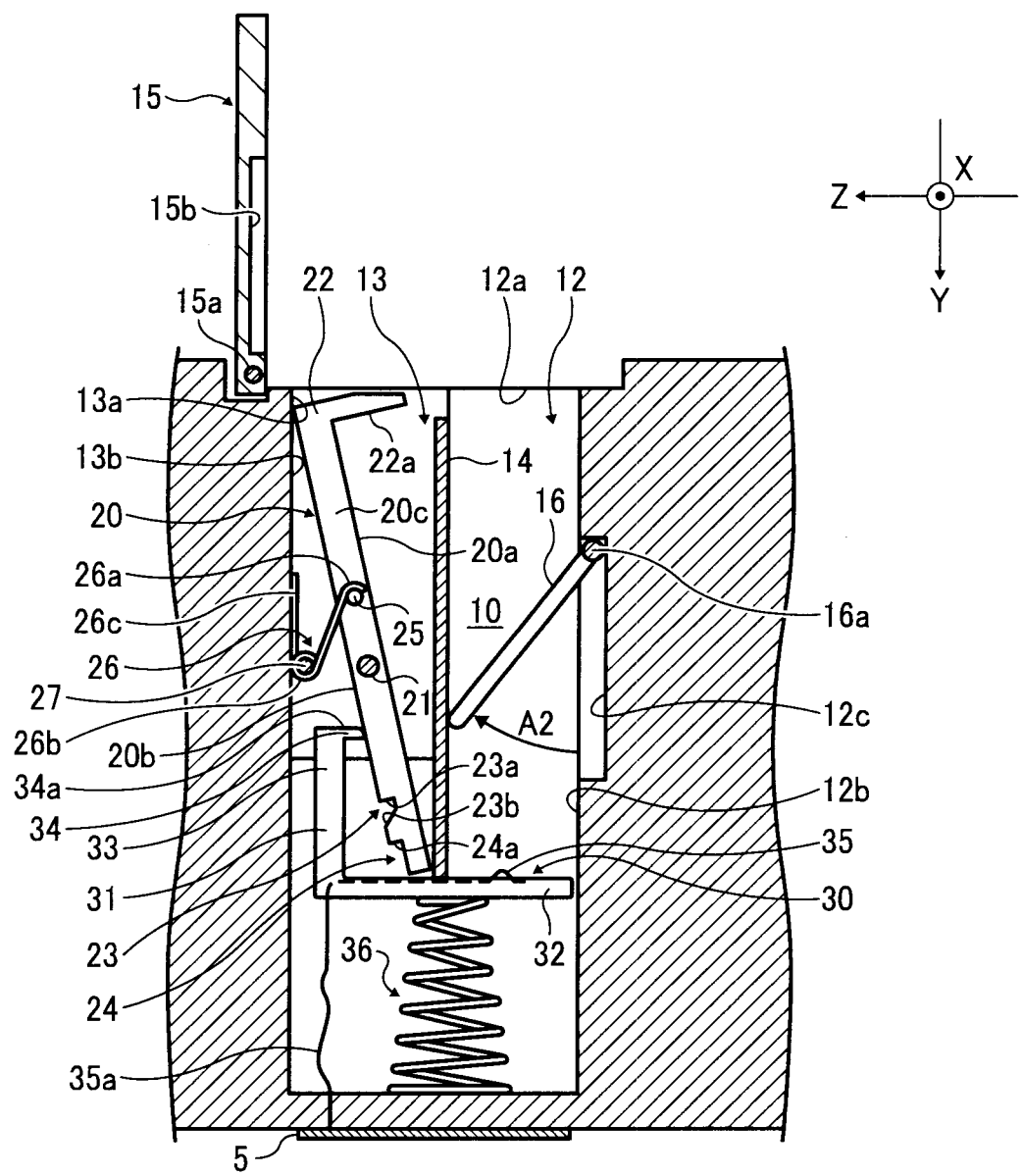
FIG. 7 is a sectional view illustrating a state where the battery cover 15 is in an open state.

Additionally, since the locking lever 20 is supported rotatably, in a state where the locking lever 20 is rotated from the locking state to a direction where the end part of the one side of the longitudinal plate part 20c of the locking lever 20 is distant from the space 12 for the battery chamber 10, the locking claw 22 is capable of evacuating from the upper part of the space 12 for the battery chamber 10 to the space 13 for the claw mechanism (see FIG. 7).

In the present embodiment, the locking claw 22 does not abut on the back face 11d of the battery 11 inserted in the space 12 for the battery chamber by evacuating to the space 13 for the claw mechanism.

Hereinafter, this position is defined as an evacuation position, and a state of the locking lever 20 at the time is defined as an evacuation state.

As illustrated in FIGS. 5A and 5B, the two engaging cut parts 23 and 24 are formed on a back face 20b of the longitudinal plate part 20c of the locking lever 20.

The two engaging cut parts 23 and 24 are formed in parallel in the direction where the longitudinal plate part 20c of the locking lever 20 extends (y-axis direction) to respectively cut the back face 20b of the longitudinal plate part 20c of the locking lever 20 along a direction of width of the longitudinal plate part 20c of the locking lever 20 (x-axis direction).

The engaging cut parts 23 and 24 respectively have engaging faces 23a and 24a that are flat. Each of the engaging faces 23a and 24a is formed to be perpendicular to the insertion direction at a back of each of the engaging cut parts 23 and 24 in the insertion direction. Additionally, the engaging cut part 23 has a slope face 23b. The slope face 23b is formed to be tilted to the insertion direction at a front of the engaging cut part 23 in the insertion direction. The engaging cut part 23 and the engaging cut part 24 are capable of changing the depth of the battery chamber 10 in cooperation with the movable member 30, as described later.

In the present embodiment, the engaging cut part 23 is provided for a battery 11A (see FIG. 6A) to be loadable, which is described later.

In the case where the engaging cut part 23 engages with an engaging projection 34 of a plate part 33 with a projection of the movable member 30, a position of the engaging cut part 23 is set such that an interval between the horizontal plate part 32 of the movable member 30 (with consideration of terminals 35 for a battery of the horizontal plate part 32) and the locking face 22a of the locking claw 22 of the locking lever 20 and the height between a contact face of the battery 11A (back face 11d) for the locking face 22a and a contact face for the terminals 35 for the battery (a contact face of output terminals 11b) are adjusted.

In the present embodiment, the engaging cut part 23 is provided for a battery 11A (see FIG. 6A) to be loadable, which is described later.

In the case where the engaging cut part 23 engages with the engaging projection 34 of the plate part 33 with the projection of the movable member 30, a position of the engaging cut part 23 is set such that an interval between the horizontal plate part 32 of the movable member 30 (with consideration of the terminals 35 for the battery of the horizontal plate part 32) and the locking face 22a of the locking claw 22 of the locking lever 20 and the height between a contact face of the battery 11A (back face 11d) for the locking face 22a and a contact face for the terminals 35 for the battery (contact face of the output terminals 11b) are adjusted.

In the present embodiment, the engaging cut part 24 is provided for a battery 11B (see FIG. 6B) to be loadable, which is described later.

In the case where the engaging cut part 24 engages with the engaging projection of the plate part 33 with the projection of the moveable member 30, a position of the engaging cut part 24 is set such that an interval between the horizontal plate part 32 of the movable member 30 (with consideration of the terminals 35 for the battery of the horizontal plate part 32) and the locking face 22a of the locking claw 22 of the locking lever 20 and the height between a contact face (back face 11d) of the battery 11B for the locking face 22a and a contact face for the terminals 35 for the battery (contact face of the output terminals 11b) are adjusted.

Here, the term "with consideration of the terminals 35 for the battery" means that an interval between the horizontal plate part 32 (its upper surface) and the locking claw 22 (its locking face 22a) is set such that by use of elastic force of the terminals 35 for the battery which is described later, the terminals 35 for the battery is capable of contacting each output terminal (see reference number 11b of FIGS. 6A and 6B) of the inserted battery 11 (each of the batteries 11A and 11B) with suitable pressing force (contact pressure).

The projection 25 for the spring is a projection that extends in the direction of width (x-axis direction) from a side face of the locking lever 20, and engages with a first end part 26a of the torsion spring 26.

A supporting shaft 27 that extends in the direction of width from a wall surface defining the space 13 for the claw mechanism is inserted in a winding part 26b of the torsion spring 26, and the torsion spring 26 is provided in the space 13 for the claw mechanism.

A second end part 26c of the torsion spring 26 engages with a wall surface 13b that faces the sectional wall 14 and defines the space 13 for the claw mechanism (see FIGS. 2 and 4).

The torsion spring 26 urges the projection 25 for the spring in the direction distant from the wall surface 13b of the space 13 for the claw mechanism (see FIG. 4 and an arrow A1 of FIG. 5).

Therefore, an urging force from the torsion spring 26 is always applied to the locking lever 20 to rotate around the rotating shaft 26 in the direction where the end part of the one side of the longitudinal plate part 20c of the locking lever 20 is close to the sectional wall 14 (the space 12 for the battery chamber), in other words, in the direction where the locking claw 22 moves from the evacuation position to the locking position.

The movable member 30, as illustrated in FIGS. 2 to 4, is a plate member which is entirely in the shape of a letter L, and has a vertical plate part 31, the horizontal plate part 32, and the plate part 33 with the projection. The vertical plate part 31 extends in the direction of height along the sectional wall 14. The horizontal plate part 32 extends in the direction of width along a bottom face of the space 12 for the battery chamber and the space 13 for the claw mechanism. The plate part 33 with the projection extends in the direction of height from the vertical plate part 31.

The vertical plate part 31 and the plate part 33 with the projection extend in the direction of height (y-axis direction) on the opposite side to the sectional wall 14 (the space 12 for the battery chamber) seen from the locking lever 20.

The horizontal plate part 32 extends in the direction of thickness (z-axis direction) across the space 12 for the battery chamber and the space 13 for the claw mechanism at the upper side of the digital camera 1 in the normal usage state.

Therefore, a part of the horizontal plate part 32 becomes a bottom plate which is placed at the upper side of the digital camera 1 in the normal usage state in the space 12 for the battery chamber, and substantially constitutes the battery chamber 10 which is a space to load (insert) the battery 11 in cooperation with the space 12 for the battery chamber (including the sectional wall 14).

The movable member 30 maintains the above-described state and is held to be slidably movable in a predetermined range of the direction of height (y-axis direction) by wall surfaces defining the space 12 for the battery chamber and the space 13 for the claw mechanism.

The predetermined range is a position of the depth from the battery removal position to a position corresponding to the depth of a battery with the largest height (in the present embodiment, the battery 11B) of loadable batteries.

The movable member 30 can be held to be slidably movable by either the wall surfaces defining the space 12 for the battery chamber or the wall surfaces defining the space 13 for the claw mechanism.

The plate part 33 with the projection of the movable member 30 has an engaging projection 34 that faces the back face 20b of the longitudinal plate part 20c of the locking lever 20 in the direction of thickness (z-axis direction) and extends toward the back face 20b.

When the engaging projection 34 abuts a part of the back face 20b of the longitudinal plate part 20c of the locking lever 20 where the engaging cut part 23 or the engaging cut part 24 is not formed, the locking lever 20 becomes the evacuation state (states illustrated in FIGS. 8A, 8B, 9A, 9B, 9C, and 9D), and when the engaging projection 34 engages with the engaging cut part 23 or the engaging cut part 24 formed on the back face 20b of the longitudinal plate part 20c of the locking lever 20, the depth of the engaging cut part 23 and the engaging cut part 24 is adjusted such that the locking lever 20 becomes the locking state (states illustrated in FIGS. 8C, and 9E).

Therefore, in the state where the engaging projection 34 is rotated in the direction opposite to the rotating direction of the locking lever 20 urged by the torsion spring 26 (states illustrated in FIGS. 7, 8A, 8B, 9A, 9B, 9D, and so on), the engaging projection 34 abuts (slides) on the back face 20b of the longitudinal plate part 20c of the locking lever 20 or the slope face 23b of the engaging cut part 23.

The engaging projection 34 has an engaging face 34a that is a flat face perpendicular to the direction of height (y-axis direction) at the upper part of the space 12 for the battery chamber and the upper part of the space 13 for the claw mechanism.

Therefore, the engaging face 34a of the engaging projection 34 abuts the engaging face 23a of the engaging cut part 23 or the engaging face 24a of the engaging cut part 24, in the state where the engaging projection 34 engages with the engaging cut part 23 or the engaging cut part 24.

In the present embodiment, in order to make sliding of the back face 20b of the longitudinal plate part 20c of the locking lever 20 and the engaging projection 34 smooth, an end part of the engaging projection 34 (engaging face 34a) is roundly chamfered.

A pair of terminals 35 for the battery is provided on the horizontal plate part 32 of the movable member 30.

One of the pair of the terminals 35 for the battery is for a positive terminal and the other is for a negative terminal, and the terminals 35 for the battery are connected to the main circuit board 5 provided in the camera body 2 via a connection line 35a (see FIG. 4).

The connection line 35a and the main circuit board 5 are electrically connected regardless of a movement of the movable member 30 (horizontal plate part 32) in the space 12 for the battery chamber, and in the present embodiment a lead is used as the connection line 35a.

The connection line 35a can be a metal spring or a FPC (flexible print circuits) and is not limited to the present embodiment if a connection line includes members having flexibility and electrical conduction.

A position where the pair of the terminals 35 for the battery is set on the basis of a position of the sectional wall 14 to adjust to a position where the output terminals 11b of each battery 11 (see reference numbers 11A and 11B of FIGS. 6A and 6B) is set.

In the present embodiment, the pair of the terminals 35 for the battery is formed by a metal piece that is folded to protrude higher than an upper surface of the horizontal plate part 32 at its intermediate position.

This is because in the case where each loadable battery 11 is loaded, the elastic force of the pair of the terminals 35 for the battery is used for obtaining a suitable pressing force for the output terminals (see reference number 11b of FIGS. 6A and 6B) of each battery 11.

As to the movable member 30, the horizontal plate part 32 on which at least the pair of the terminals 35 for the battery is provided is formed by a material having an electrical insulation.

The movable plate 30 is urged toward the upper part of the space 12 for the battery chamber and the upper part of the space 13 for the claw mechanism (upper side of FIGS. 2, 4 and so on (negative side in the y-axis direction)) by the coil spring 36 as a urging member provided on the bottom face of the space 12 for the battery chamber and the space 13 for the claw mechanism.

Therefore, in the state where the engaging projection 34 of the plate part 33 with the projection does not engage with the engaging cut part 23 or the engaging cut part 24 of the locking lever 20, the movable member 30 is urged by the coil spring 36 and moved to a position most distant from the bottom face (see FIG. 7) in a slidably movable range along the direction of height (y-axis direction) (hereinafter, this position is referred to as a battery removal position.).

Thus, the movable member 30 is at the battery removal position, as illustrated in FIG. 7, the engaging projection 34 (its end part) of the plate part 33 with the projection abuts a position on the back face 20b of the longitudinal plate part 20c of the locking lever 20 which is closest to the rotating shaft 21.

Therefore, the locking lever 20 is urged by the torsion spring 26 and rotated around the rotating shaft 21, and becomes the evacuation state as the locking claw 22 is in the evacuation position.

The urging force of the coil spring 36 is set such that a state where a battery (battery 11A or battery 11B) is loaded in the battery chamber, that is, a state where the engaging projection 34 of the plate part 33 with the projection of the movable member 30 engages with the engaging cut part 23 or the engaging cut part 24 provided on the locking lever 20 is maintained against a moving force in the direction of height (y-axis direction) that may occur in the inserted battery (battery 11A or battery 11B).

Here, the moving force in the direction of height that may occur in the inserted battery is caused by inertia that occurs in the inserted battery with an assumed rapid movement of the battery in the battery chamber 10 (digital camera having the battery chamber 10).

In the present embodiment, a pressing plate 16 is provided on a wall 12b facing the sectional wall 14 to define the space 12 for the battery chamber.

The pressing plate 16 is in the shape of flat-plate and stored in a concave part 12c formed on the wall 12b.

The pressing plate 16 has a rotating shaft 16a at one end of the pressing plate 16 (upper part of the space 12 for the battery chamber (upper side of FIGS. 2, 4 and so on (negative side in the y-axis direction))), and the rotating shaft 16a is held rotatably in the direction of width (x-axis direction) in the concave part 12c.

The pressing plate 16 is urged by a torsion spring, for example, which is not illustrated, toward the direction where the pressing plate 16 protrudes from the concave part 12c to the space 12 for the battery chamber (see an arrow A2 of FIG. 4).

Therefore, in the state where the battery 11 is not loaded (inserted) in the battery chamber 10, the pressing plate 16 rotates around the rotating shaft 16a to a state that the other end of the pressing plate 16 abuts the sectional wall 14 (see the pressing plate 16 illustrated by a two-dot chain line of FIG. 4).

Figure 6A:
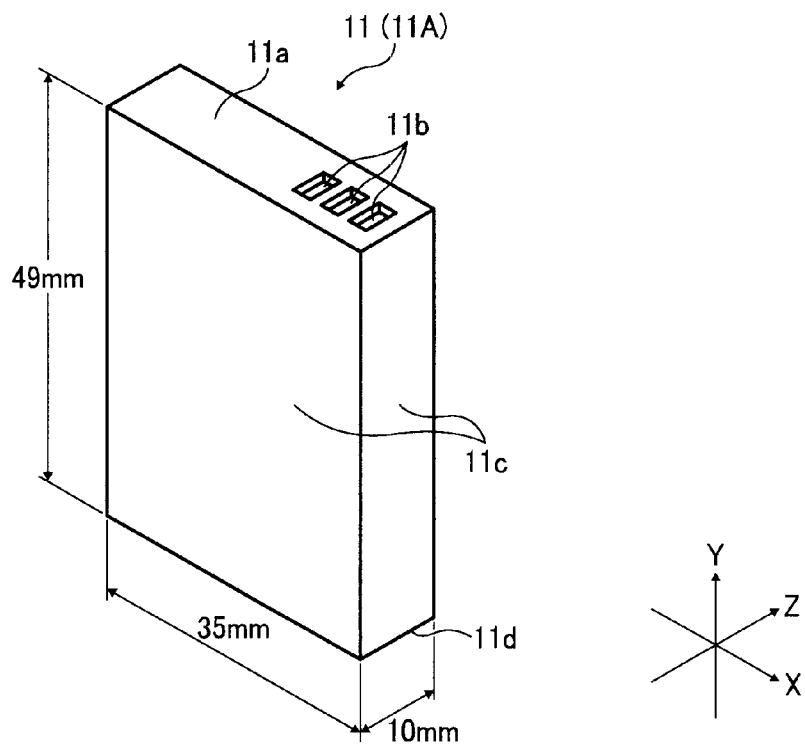
FIG. 6A is a schematic perspective view illustrating one of two kinds of loadable batteries and illustrates a battery 11A which is short in height.
Figure 6B:
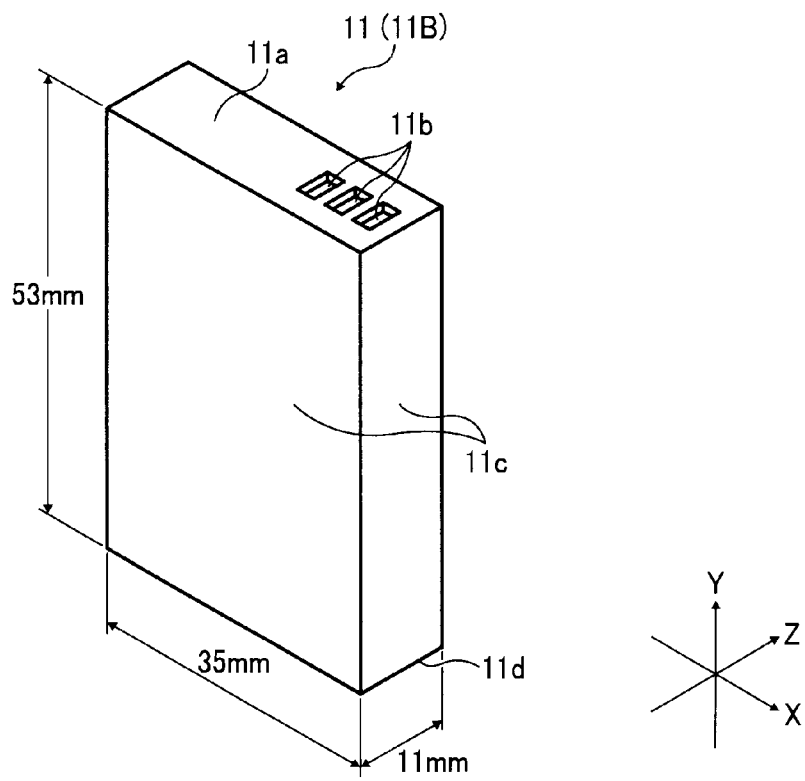
FIG. 6B is a schematic perspective view illustrating one of two kinds of loadable batteries and illustrates a battery 11B which is tall in height.

In the present embodiment, as illustrated in FIGS. 6A and 6B, mainly two kinds of batteries 11 (batteries 11A and 11B) of which the height of each is different (when described individually, a battery short in height is taken as a battery 11A and a battery tall in height is taken as a battery 11B.) are loaded in the battery chamber 10.

That is, the battery chamber 10 is capable of suitably loading both of the batteries 11A and 11B.

The two kinds of the batteries 11 (batteries 11A and 11B) have the same output voltage, and each position where the output terminals 11b are set on a front face 11a of each battery 11 in the insertion direction is approximately equal.

Here, the term "approximately equal" means that front faces 11a of both batteries 11A and 11B do not have exactly the same shapes because the thicknesses of the batteries of 11A and 11B are slightly different.

In the present embodiment, as described above, the position of the pair of the terminals 35 for the battery is set on the basis of the position of the sectional wall 14.

Therefore, the position of the output terminals 11b is set on the basis of a face facing the sectional wall 14 of the peripheral faces 11c of the battery 11A in the state where the battery 11A is loaded (inserted) in the battery chamber 10 and is approximately equal to the positions of the terminals 35 for the battery.

The output terminals 11b include three parallel concave parts, and a first one is a positive terminal, a second one is a negative terminal, and a third one is a terminal for control.

In the battery chamber 10 according to the present embodiment, the pair of the terminals 35 for the battery on the horizontal plate part 32 of the movable member 30 corresponds to the two terminals, namely, the positive and negative terminals of the output terminals 11b of the battery 11 (see FIGS. 2 and 3).

In the present embodiment, the battery 11A illustrated in FIG. 6A is 49 mm in height (y-axis direction), 35 mm in width (x-axis direction), and 10 mm in thickness (z-axis direction) seen from the insertion direction. And the battery 11B illustrated in FIG. 6B is 53 mm in height (y-axis direction), 35 mm in width (x-axis direction), and 11 mm in thickness (z-axis direction) seen from the insertion direction.

Thus, dimensions (in the present embodiment, mainly the height) of the batteries are different, though the batteries have the same output voltage. This is because the capacities of the batteries are different, the sizes of the batteries having the same capacity are reduced by innovation in technology, manufacturers of the batteries are different (on the premise that the positions where the output terminals are set are approximately equal), and so on.

Next, loading and removal of the two kinds of the batteries 11A and 11B in and from the battery chamber 10 will be explained by use of FIGS. 7 to 10B.

In the following explanations of loading and removal of the batteries, a vertical direction where FIGS. 7 to 10B are seen from the front is used.

Firstly, loading of the battery 11A which is small (short in height) will be explained by use of FIGS. 7, 8A, 8B, and 8C.

When loading a battery in the battery chamber 10, firstly, as illustrated in FIG. 7, a locking mechanism (not illustrated) is released and the battery cover 15 is in the open state.

At this time, as described above, in the battery chamber 10, the movable member 30 is urged upward by the coil spring 36 and in the battery removal position, and the engaging projection 34 (its end) of the plate part 33 with the projection abuts the back face 20b of the longitudinal plate part 20c of the locking lever 20, and thereby the locking lever 20 becomes the evacuation state, and the locking claw 22 is in the evacuation position.

The pressing plate 16 is rotated to a state where an end of the pressing plate 16 abuts the sectional wall 14.

As illustrated in FIG. 8A, to adjust the position of the output terminals 11b (see FIG. 6A) to the position of the terminals 35 for the battery in the battery chamber 10 (see FIGS. 2 and 3), from the front face 11a of the battery 11A, the battery 11A is inserted into the battery loading gate 12a (the space 12 for the battery chamber).

At this time, the pressing plate 16 is pressed by a peripheral face 11c of the battery 11A and is rotated to the direction evacuating to the concave part 12c of the space 12 for the battery chamber, and presses the peripheral face 11c, and the battery 11A is pressed against the sectional wall 14.

By inserting the battery 11A as described above, the upper surface of the horizontal plate part 32 of the movable member 30 in the battery removal position faces the front face 11a of the battery 11A, and the pair of the terminals 35 for the battery on the horizontal plate part 32 is connected to two corresponding terminals (the positive and negative terminals) of the output terminals 11b of the battery 11A.

And then, the back face 11d of the battery 11A (a face in the upper side in FIGS. 8A to 8C) is pressed, and the battery 11A is pressed into the space 12 for the battery chamber (the battery chamber 10) against the urging force of the coil spring 36.

And, as illustrated in FIG. 8B, the movable member 30 (the horizontal plate part 32) is pressed down via the battery 11A, and a position where the engaging projection 34 (its end) of the plate part 33 with the projection of the movable member 30 abuts the back face 20b of the longitudinal plate part 20c of the locking lever 20 moves downward to move away from the rotating shaft 21.

Therefore, the locking lever 20 is urged by the torsion spring 26, and thereby the locking lever 20 begins rotating around the rotating shaft 21 to the direction where the locking claw 22 moves from the evacuation position to the locking position (see an arrow A1 of FIG. 4).

A rotating state of the locking lever 20 changes based on the position where the engaging projection 34 of the plate part 33 with the projection of the movable member 30 abuts the back face 20b.

And then, the movable member 30 is further pressed down via the battery 11A, as illustrated in FIG. 8C, and the engaging projection 34 (its end) of the plate part 33 with the projection of the movable member 30 which moves downward reaches the engaging cut part 23 which is closer to the rotating shaft 21.

And, the locking lever 20 rotates to a state where the engaging projection 34 (its end) of the plate part 33 with the projection of the movable member 30 engages with the engaging cut part 23.

As described above, the size of the engaging projection 34 is set such that the engaging projection 34 engages with the engaging cut part 23 when the locking lever 20 is in the locking state, and therefore the locking lever 20 rotates to the locking state.

At this time, the locking claw 22 (its end part) of the locking lever 20 moves over the sectional wall 14 from the upper part of the space 13 for the locking mechanism, and protrudes on the upper part of the space 12 for the battery chamber, and the position where the locking claw 22 protrudes becomes the locking position where the locking claw 22 locks the battery 11A.

And, by setting of positions the locking lever 20 and the movable plate 30, the locking face 22a of the locking claw 22 abuts the back face 11d of the battery 11A.

At this time, in the battery chamber 10, by setting of the position of the engaging cut part 23 of the locking lever 20, an interval between the horizontal plate part 32 of the movable member 30 and the locking face 22a of the locking claw 22 of the locking lever 20 is adjusted to the height between the contact face (back face 11d) of the battery 11 for the locking face 22a and the contact face for the terminals 35 for the battery (contact face of the output terminals 11b), and becomes the depth that is adjusted to the height of the battery 11A.

Therefore, in the battery chamber 10, the pair of the terminals 35 for the battery on the horizontal plate part 32 abuts the output terminals 11b of the battery 11A with a suitable pressing force.

Therefore, in the battery chamber 10, only inserting the battery 11A from the battery loading gate 12a makes it possible to load the battery 11A properly, because the depth is adjusted to the height of the battery 11A in cooperation with the locking lever 20 and the movable member 30.

Next, loading of the battery 11B which is large (tall in height) will be explained by use of FIGS. 7, and 9A to 9E.

Firstly, the battery cover 15 is in the open state (see FIG. 7).

Next, as illustrated in FIG. 9A, to adjust the position of the output terminals 11b (see FIG. 6A) to the position (see FIGS. 2 and 3) of the terminals 35 for the battery in the battery chamber 10, and from the front face 11a of the battery 11B, the battery 11B is inserted into the battery loading gate 12a (the space 12 for the battery chamber).

Then, as well as loading of the battery 11A, the battery 11B is pressed against the sectional wall 14 by the pressing plate 16, and the upper surface of the horizontal plate part 32 of the movable member 30 in the battery removal position faces the front face 11a of the battery 11B, and the pair of the terminals 35 for the battery on the horizontal plate part 32 abuts two corresponding terminals (the positive and negative terminals) of the output terminals 11b of the battery 11B.

And then, the back face 11d of the battery 11B (a face in the upper side in FIGS. 8A to 8C) is pressed, and the battery 11B is pressed into the space 12 for the battery chamber (the battery chamber 10) against the urging force of the coil spring 36.

And, as illustrated in FIG. 9B, the movable plate 30 is pressed down via the battery 11B, and therefore the locking lever 20 is urged by the torsion spring 26, and thereby the locking lever 20 begins rotating around the rotating shaft 21 in the direction where the locking claw 22 moves from the evacuation position to the locking position (see an arrow A1 of FIG. 4).

And then, the movable member 30 is further pressed down via the battery 11B, as illustrated in FIG. 9C, and the engaging projection 34 (its end) of the plate part 33 with the projection of the movable member 30 which moves downward and reaches the engaging cut part 23 which is closer to the rotating shaft 21.

Therefore, the locking lever 20 rotates to a state (locking state) where the engaging projection 34 of the plate part 33 with projection of the movable member 30 engages with the engaging cut part 23.

At this time, the engaging cut part 23 is adjusted to the battery 11A which is short in height, and the battery 11B which is larger than the battery 11A is not loaded properly in the space 12 for the battery chamber (battery chamber 10), and therefore, the locking claw 22 (its end) of the locking lever 20 abuts a peripheral face 11c of the battery 11B, and the locking lever 20 does not rotate to the locking state.

And then the movable member 30 is still further pressed down via the battery 11B, as illustrated in FIG. 9D, and the movable member 30 is moved downward and the engaging projection 34 slides on the slope face 23b of the engaging cut part 23, and comes out of the engaging cut part 23, and abuts (slides) the back face 20b between the engaging cut part 23 and the engaging cut part 24 of the locking lever 20.

And then, the movable member 30 is still further pressed down via the battery 11B, as illustrated in FIG. 9E, and the engaging projection 34 (its end) of the plate part 33 with the projection of the movable member 30 which moves downward reaches the engaging cut part 24 which is distant from the rotating shaft 21.

And, the locking lever 20 rotates to a state where the engaging projection 34 of the plate part 33 with the projection of the movable member 30 engages with the engaging cut part 23, and becomes the locking state.

In this state, by setting of the positions of the locking lever 20 and the movable member 30, the locking face 22a of the locking claw 22 abuts the back face 11d of the battery 11B.

At this time, in the battery chamber 10, by setting of the position of the engaging cut part 24 of the locking lever 20, an interval between the horizontal plate part 32 of the movable plate 30 and the locking face 22a of the locking claw 22 of the locking lever 20 is adjusted to the height between the contact face (back face 11d) of the battery 11B for the locking face 20a and the contact face for the terminals 35 for the battery (contact face of the output terminals 11b), and becomes the depth that is adjusted to the height of the battery 11B.

Therefore, in the battery chamber 10, the pair of the terminals 35 for the battery on the horizontal wall part 32 abuts on the output terminals 11b of the battery 11B with a proper pressing force.

Therefore, in the battery chamber 10, only inserting the battery 11B from the battery loading gate 12a makes it possible to load the battery 11B properly, because the depth is adjusted to the height of the battery 11B in cooperation with the locking lever 20 and the movable member 30.

Thus, in the battery chamber 10, the locking lever 20 (rotating shaft 21, locking claw 22, engaging cut part 23, and engaging cut part 24), the movable member 30 (vertical plate part 31, horizontal plate part 32, plate part 33 with the projection, and engaging projection 34), and the coil spring 36 function as the claw mechanism for adjusting the depth of the battery chamber 10 to the height of each loadable battery.

Next, removal of each loaded battery 11 (each of loaded batteries 11A and 11B) from the battery chamber 10 will be explained. The removal of each loaded battery 11 is the same, regardless of the height of batteries, and therefore, here, by use of FIGS. 10A and 10B, the removal of the battery 11A from the battery chamber 10 will be explained, and that of the battery 11B will not be explained.

Figure 10A:
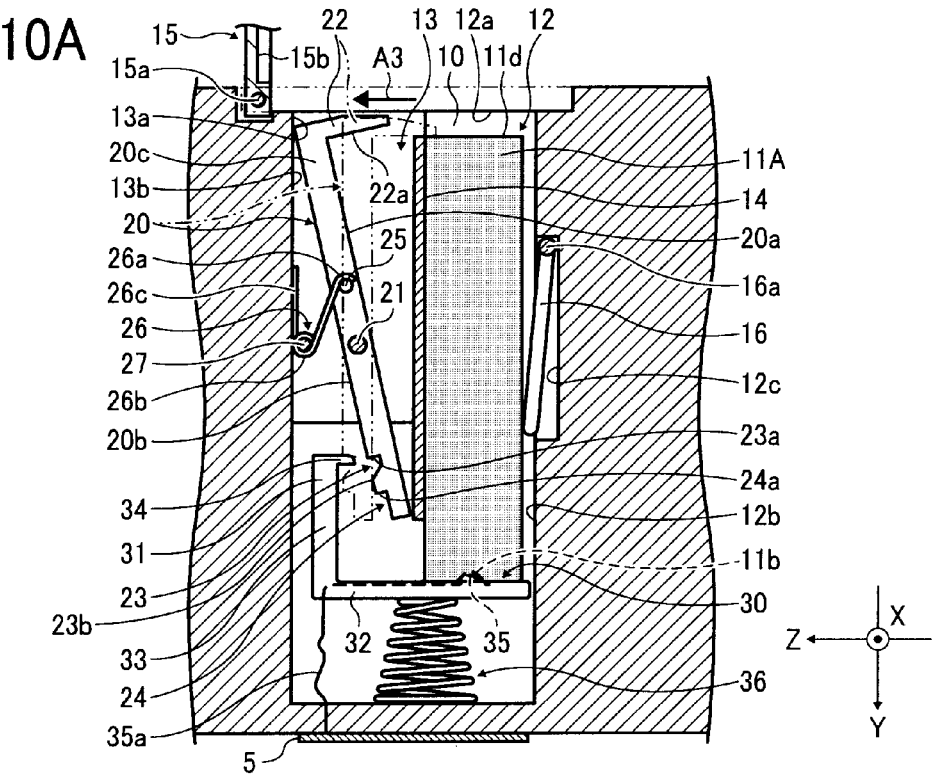
FIG. 10A is an explanatory view explaining a state where the battery 11A is removed from the battery chamber 10 and illustrates a state where a locking claw 22 is moved from a locking position to an evacuation position.

In the case of the removal of the battery 11A, as illustrated in FIG. 10A, firstly, the battery cover 15 is in the open state. The locking claw 22, the engaging face 22a of which abuts the back face 11d of the battery 11A, is moved to the space 13 for the claw mechanism (insertion gate 13a), and evacuated from the upper part of the space 12 for the battery chamber (battery loading gate 12a) (see an arrow A3 of FIG. 10A). That is, the locking claw 22 is moved from the locking position to the evacuation position. Therefore, the locking lever 20 rotates around the rotating shaft 20, and the engaging projection 34 comes out of the engaging cut part 23 on the back face 20b, and an engagement of the engaging cut part 23 and the engaging projection 34 is removed. Accordingly, a limitation of an upward movement of the movable member 30 is removed.

Figure 10B:
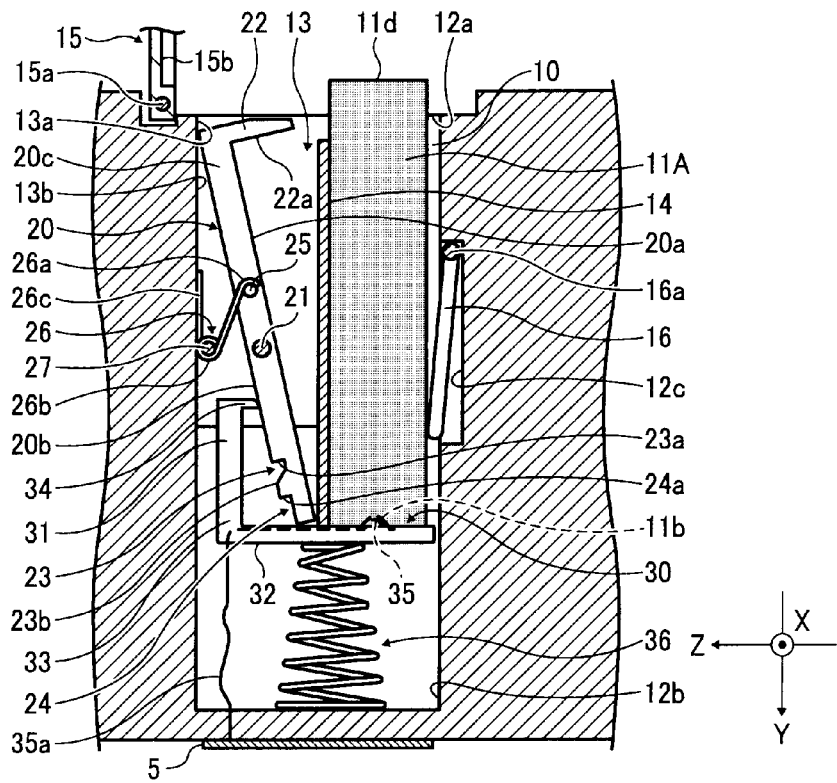
FIG. 10B is an explanatory view explaining the state where the battery 11A is removed from the battery chamber 10 and illustrates a state where a horizontal plate part 32 becomes a battery removal position.

And then, as illustrated in FIG. 10B, the movable member 30 is urged upward (toward the battery loading gate 12a) by the coil spring 36, and thereby moves upward to the battery removal position that is an upper limit position in a slidably movable range.

Therefore, the battery 11A is pressed by the horizontal plate part 32 moving upward by the upward movement of the movable member 30 and moved upward, and a part of the battery 11A is protruded from the battery loading gate 12a of the battery chamber 10. And accordingly, the battery 11A is easily removed from the battery chamber 10.

At this time, the engaging projection 34 (its end) of the plate part 33 with the projection of the movable member 30 abuts the back face 20b of the longitudinal plate part 20c of the locking lever 20, and thereby the locking lever 20 is held to be in the evacuation state.

Thus, in the battery chamber 10, the horizontal plate part 32 of the movable member 30 functions as a moving mechanism of the terminals 35 for the battery to set the depth, and functions as a removal mechanism of the loaded battery 11A in cooperation with the coil spring 36.

In the battery chamber 10 (digital camera 1 having the battery chamber 10), by setting of the positions of the locking lever 20 and the movable plate 30, if any one of the two kinds of the batteries 11A and 11B where there is no difference in the external shape other than the height is inserted in the battery chamber 10, the depth of the battery chamber 10 is adjusted to the inserted battery properly. Therefore, the battery 11A or the battery 11B is loaded properly. That is, the locking claw 22 of the locking lever 20 suitably moves from the evacuation position to the locking position, as the horizontal plate part 32 is pressed via each battery 11 and a position of height (a position of depth seen from the battery loading gate 12a) of the movable member 30 is changed, and the depth of the battery chamber 10 is changed by only a difference in height of the inserted battery, regardless of the external shape of the inserted battery.

In the battery chamber 10 (digital camera 1 having the battery chamber 10), it is possible to adjust the depth of the battery chamber 10 to the inserted battery by only inserting each of the two kinds of batteries 11A and 11B where heights are different.

And therefore, it is possible to prevent an instantaneous interruption and a buckling of terminals, which are described later, deterioration in usability, and deterioration in durability of the battery chamber itself (electronic device having the battery chamber itself).

In the case where there is no difference in an external shape of a battery other than height, generally, a constitution of a battery chamber such that a coil spring is provided in a position facing the terminals, the difference in size is absorbed by expansion and contraction of the coil spring, and the battery is pressed against the terminals is considered.

In the case of the above constitution, when inserting a battery tall in height, a coil spring greatly compressed presses the battery against the terminals, and when inserting a battery short in height, a coil spring slightly compressed presses the battery against the terminals, therefore contact pressure between the battery and the terminals changes depending on the height of the battery.

Here, in the case where there is not enough contact pressure for the battery short in height, the battery moves in the battery chamber because of inertia which occurs in the battery with a rapid movement of the battery in the battery chamber (electronic device having the battery chamber), and thereby the battery and the terminals are instantaneously separated, and there may be a problem such that electric power supply is instantaneously cut off, that is, a so-called instantaneous interruption occurs.

Consequently, if the coil spring (its elastic force) is set to obtain enough contact pressure for the battery short in height, there may be problems such that when a battery large in size is loaded (inserted), the coil spring is greatly compressed, and thereby usability of loading of the battery against a great elastic force of the coil spring is deteriorated, and the terminals are buckled because of excess contact pressure between the battery (its output terminal) and the terminals, and durability of the battery chamber itself (electronic device having the battery chamber itself) is reduced because of excess pressure on parts constituting the battery chamber.

On the other hand, a constitution of the battery chamber 10 according to the present embodiment of the present invention is such that the coil spring 36 which urges the movable member 30 upward acts as an urging force to maintain a state where the engaging projection 34 of the plate part 33 with the projection of the movable member 30 engages with the engaging cut part 23 or the engaging cut part 24 of the locking lever 20, and thereby a suitable depth is maintained.

That is, the engaging cut part 23 or the engaging cut part 24 receives the urging force of the coil spring 36 via the engaging projection 34, therefore regardless of expansion and contraction of the coil spring 36, contact pressure between each battery 11 (output terminals 11b) and the terminals 35 for the battery is suitably adjusted.

Accordingly, in the battery chamber 10, it is possible to prevent an instantaneous interruption and the buckling of the terminals from occurring.

In addition, in the battery chamber 10, the urging force of the coil spring 36 is set to maintain a state where the engaging projection 34 engages with the engaging cut part 23 or the engaging cut part 24 regardless of the contact pressure between each battery 11 (output terminals 11b) and the terminals 35 for the battery, and thereby it is possible to prevent excess pressure on parts constituting the battery chamber 10 like a conventional constitution in which the difference in size is absorbed by the expansion and contraction of the coil spring and a battery is pressed against the terminals, and therefore, it is possible to prevent the durability of the battery chamber 10 itself (digital camera 1 having the battery chamber 10 itself) from reducing.

Moreover, in the battery chamber 10, in a state where the elastic force of the coil spring 36 is used to adjust the depth of the battery chamber 10 to each battery 11, and the depth is adjusted, the elastic force of the terminals 35 for the battery is used to adjust the contact pressure between each battery 11 (output terminals 11b) and the terminals 35 for the battery, and thereby only the coil spring 36 is greatly compressed to adjust to the battery 11B which is tall in height. Therefore, compared to using a coil spring the elastic force of which is set to absorb the difference in height and adjust the contact pressure between the battery and the terminals, it is possible to prevent the deterioration of usability.

Additionally, in the battery chamber 10 (digital camera 1 having the battery chamber 10), the movable member 30 that is held to be slidably movable in the predetermined range of the direction of height is pressed into the space 12 for the battery chamber and the space 13 for the claw mechanism via each battery 11 (the batteries 11A and 11B) against the urging force of the coil spring 36, and therefore it is possible to load each battery 11 (battery 11A or battery 11B) properly, and remove the loaded battery (battery 11A or battery 11B) easily.

Generally in this case, in order to remove the inserted battery, it is considered to provide a coil spring that directly urges the battery in the direction of removing the battery from the battery chamber.

In the case of such a constitution as the above, when loading the battery, the battery is tilted, and there may be a problem such that the coil spring leans (including curving greatly).

If the coil spring leans as described above, there may be problems such that a suitable contact between the battery (its output terminal) and the terminal is interrupted, and the terminals that do not intend to contact each other short-circuit each other by the leaned coil spring.

Additionally, if the coil spring leans, the leaned coil spring is not able to push the loaded battery properly, therefore it is difficult to remove the inserted battery.

On the other hand, in the battery chamber 10, the coil spring 36 is pressed via the movable member 30 that is held to be slidably movable in the predetermined range of the direction of height, therefore it is possible to prevent the force in the direction perpendicular to the direction where the coil spring 36 is compressed from acting on the coil spring 36, and therefore it is possible to prevent the coil spring from leaning.

Additionally, in the battery chamber 10, between the coil spring 36 and the pair of the terminals 35 for the battery, the horizontal plate part 32 having the electrical insulator is provided, therefore even in the case where the coil spring 36 leans due to an unexpected occurrence, it is possible to reliably prevent the terminals from short-circuiting each other.

In the battery chamber 10, by adjusting the setting of the positions of the locking lever 20 and the movable member 30, in particular, by adjusting positions where engaging cut parts on the locking lever 20 are set, it is possible for a battery having an arbitrary height to be loadable. Therefore, it is possible to improve versatility, and easily increase a capacity of the battery.

In the battery chamber 10, since each of the inserted batteries 11A and 11B is pressed by the pressing plate 16 to be pushed against the sectional wall 16, even in the case where there is a difference in thickness between the battery 11A and the battery 11B in addition to the difference in height between those, it is possible to contact the output terminals 11b of each of the batteries 11A and 11B with the terminals 35 for the battery properly by only inserting each battery 11 (each of the batteries 11A and 11B) from the battery loading gate 12a.

And, regardless of the number of kinds of loadable batteries, it is possible to load each battery 11 properly by only providing the pair of the terminals 35 for the battery. Thus, since it is only necessary to provide the pair of the terminals 35 for the battery, it is possible to contribute to cost reduction by reducing the number of components and space-saving.

The difference in thickness between those is adjusted by adjusting a position of the pair of the terminals 35 for the battery that is set on the basis of a position of the sectional wall 14 to a position of the output terminals 11 that is set on the basis of a position of a face which abuts the sectional wall 14 of peripheral faces 11c of the battery 11 (battery 11A and battery 11B) (including an allowable range of the difference in size between the terminals 35 for the battery and the output terminals 11b).

Thus, in the battery chamber 10 according to the embodiment of the present invention, regardless of the difference in the external shape, it is possible to load different kinds of batteries which are different in height.

In the above embodiment, two engaging cut parts 23 and 24 are formed at different height positions on the back face 20b of the longitudinal plate part 20c of the locking lever 20, and thereby two kinds of the batteries 11A and 11B which are different in height are loadable, however increasing the number of engaging cut parts makes it possible to increase the number of kinds of loadable batteries, and therefore the number of kinds of loadable batteries is not limited to two kinds, and is not limited to the above embodiment.

Additionally, it is preferable that in the case of increasing the number of engaging cut parts, an engaging cut part which is positioned at the front of the longitudinal plate part 20c of the locking lever 20 in the insertion direction be formed to be the same as the engaging cut part 24, and to be capable of smoothly sliding of the engagement projection 34, and engaging cut parts other than the above engaging cut part be formed to be the same as the engaging cut part 23 having the slope face 23b In the above embodiment, the above-described claw mechanism as the claw mechanism for the battery includes the locking lever 20, the movable member 30, and the coil spring 36, however it is not limited to the above embodiment. It is preferable that a bottom plate (corresponding to the horizontal plate part 32) be movable in the insertion direction of the battery, and a locking claw (corresponding to the locking claw 22) be movable between the evacuation position and the locking position, and in the case where the battery is inserted, the bottom plate be pushed by the battery and move in the insertion direction, and thereby space of the battery chamber be extended in the insertion direction, and additionally, in the case where an interval between a position of the locking claw which is at the locking position and the bottom plate is adjusted to the height of the inserted battery, the locking claw move from the evacuation position to the locking position, and at least two kinds of batteries which are different in length (height) in the insertion direction be loadable.

Figure 11:
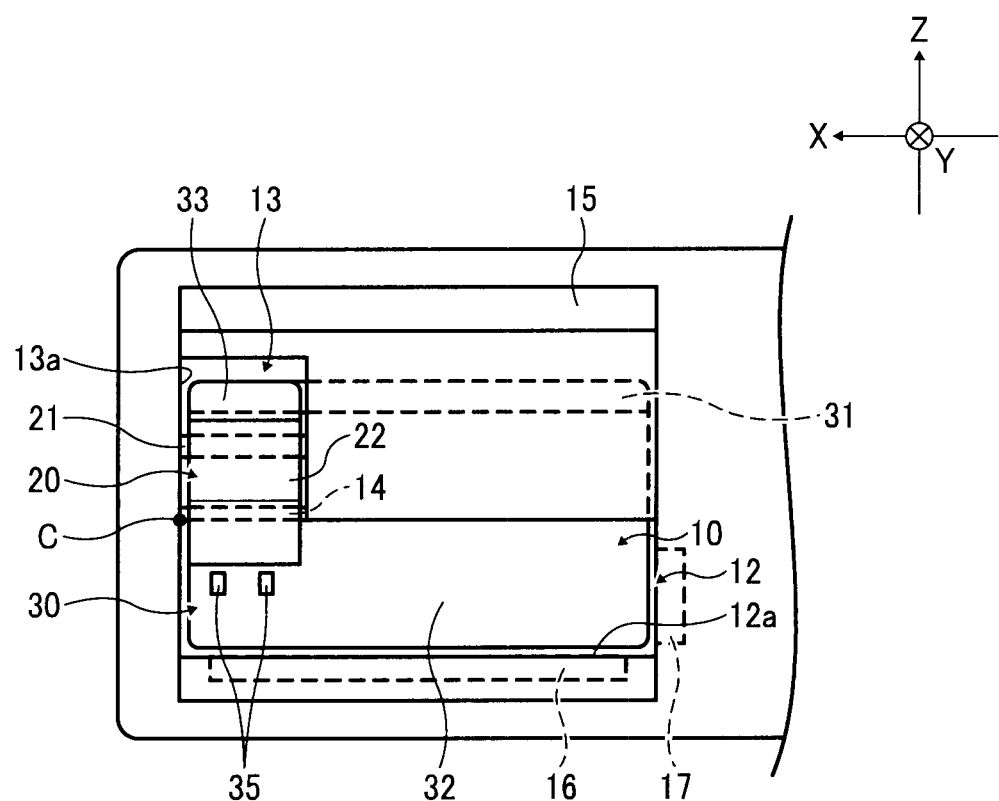
FIG. 11 is a bottom view explaining a reference position with regard to a direction where a battery is pressed by a pressing plate.

In addition, in the above embodiment, the pressing plate 16 that presses the inserted battery 11 in the direction of thickness of the battery 11 and presses the inserted battery 11 against the sectional wall 14 is provided, and as illustrated in FIG. 11, a pressing plate 17 that presses the inserted battery in the direction of width (due to a constitution of the pressing plate 17 similar to that of the pressing plate 16, an explanation of the pressing plate 17 is omitted.) can also be provided.

Thus, in the case where the pressing plate 17 is also provided, the battery is pushed against a point C illustrated in FIG. 11, therefore a position of the terminals (35) for the battery is set on the basis of the point C, and thereby when inserting the battery, a position of the output terminals (11b) of the battery and a position of the terminals (35) for the battery can be accurately adjusted (including an allowable range of the difference in size between the terminals for the battery and the output terminals), and it is possible to obtain suitable electrical power regardless of the batteries which are different in size.

It is possible to load a plurality of batteries which are different in height without the pressing plate 16 and the pressing plate 17 (pressing mechanism), however when the predetermined condition described above is satisfied, it is possible to load batteries which are different in thickness and width by having the pressing plate 16 and the pressing plate 17, therefore it is preferable to have the pressing plate 16 and the pressing plate 17.

A direction that presses the battery with the pressing plate can be any direction, and is not limited to the above embodiment.

In the above embodiment, as an example of an electronic device, the digital camera 1 has been described, but is not limited to the above embodiment, and the electronic device can be one having a battery chamber to load a battery.

In the above embodiment, the movable member 30 is urged by the coil spring 36 in a direction opposite to the insertion direction (the removal direction) of the battery, however an urging member that urges the movable member 30 can be any member that urges the movable member 30 in the direction opposite to the insertion direction of the battery.

In the above embodiment, the pair of the terminals 35 for the battery is provided on the horizontal plate part 32 (bottom plate) of the movable member 30, but is not limited to the above embodiment, and can be provided on the battery cover 15.

In the battery chamber according to the embodiment, based on the position of height of the bottom plate (position of depth seen from the battery loading gate), the locking claw suitably moves from the evacuation position to the locking position, therefore it is possible to change the depth of the battery chamber by a difference of height, regardless of the external shape.

According to the embodiment, the claw mechanism can be formed by a simple constitution, and a battery which has an arbitrary height is loadable by only adjusting a position where the engaging cut part is set, and additionally, the number of loadable batteries can be set by adjusting the number of engaging cut parts.

According to the embodiment, the bottom plate is capable of functioning as a moving mechanism to set the depth of the battery chamber, and as a removal mechanism of the loaded battery.

According to the embodiment, it is possible to maintain the depth of the battery chamber adjusted to the height of each loadable battery by an urging force toward the bottom plate. Additionally, a movement of the engaging projection, that is, a movement of the bottom plate can be smoothly performed in the case where a battery tall in height is inserted.

According to the embodiment, if positions of the terminals for the battery and the output terminals of the battery seen from the direction of height are set correspondingly on the basis of a direction that the pressing plate presses, a battery which is different in dimensions other than height can also be loadable.

In the electronic device or the imaging device having the battery chamber according to the embodiment, various kinds of batteries can be used.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A battery chamber comprising:
a claw mechanism for a battery including:
    a movable member that is movable in insertion and removal directions of a battery, and abuts a front face of the battery in the insertion direction when the battery is inserted and completely loaded;
    an urging member that urges the movable member in the removal direction; and
    a stopper having:
        a locking claw that locks a back face of the battery from behind in the insertion direction when the battery is completely loaded,
    wherein in a case where the battery is inserted, and the movable member is pressed and moved in the insertion direction by the battery, and then an interval in the insertion direction between the movable member and the locking claw becomes a length of the battery in the insertion direction, the locking claw moves from an evacuation position of the locking claw where the locking claw does not interfere with the battery when the battery is inserted to a locking position of the locking claw where the locking claw locks the back face of the battery from behind in the insertion direction when the battery is completely loaded.

2. The battery chamber according to claim 1, wherein the stopper includes a longitudinal plate part that extends in the insertion direction, and the locking claw is formed at a back end part of the longitudinal plate part of the stopper in the insertion direction, and a plurality of engaging parts corresponding to respective lengths that are not the same of a plurality of batteries that engage with the movable member are provided in parallel on a face of the longitudinal plate part of the stopper along a direction where the longitudinal plate part extends.

3. The battery chamber according to claim 2, wherein the plurality of engaging parts are a plurality of engaging cut parts that are formed in parallel on a face of the longitudinal plate part of the stopper along a direction where the longitudinal plate part extends,
    wherein an engaging projection that engages with one of the plurality of engaging cut parts is formed on the movable member, and
    wherein the locking claw moves to the evacuation position in a case where the engaging projection abuts at least one part of the face of the longitudinal plate part of the stopper where the engaging cut parts are not formed and the locking claw moves to the locking position in a case where the engaging projection engages with one of the engaging cut parts formed on the longitudinal plate part of the stopper.

4. The battery chamber according to claim 3, wherein at least one of the engaging cut parts includes:

an engaging face that is formed to be perpendicular to the insertion direction at a back of the at least one of the engaging cut parts in the insertion direction; and a slope face that is formed to be tilted to the insertion direction at a front of the at least one of the engaging cut parts in the insertion direction, wherein in a case where the engaging projection engages with one of the engaging cut parts, the engaging projection abuts the engaging face and thereby the engaging face limits a movement of the movable member in the removal direction, and wherein in a case where the movable member is pressed by the battery and moved in the insertion direction, the slope face removes an engagement of the engaging projection and the one of the engaging cut parts, and the engaging projection engaging with the one of the engaging cut parts comes out of the one of the engaging cut parts and slides on the at least one part of the face of the longitudinal plate part of the stopper where the engaging cut parts are not formed.

5. The battery chamber according to claim 1, further comprising:

a battery cover that covers the battery chamber from behind in the insertion direction;

at least one sectional wall that extends in the insertion direction;

at least one pair of terminals for the battery where a terminal of the battery connects that is formed on one of the battery cover and the movable member, and a pressing plate that presses the battery in a direction perpendicular to the insertion direction and in a direction perpendicular to the at least one sectional wall to abut on the at least one sectional wall and moves the battery to a position where a position of the terminal of the battery and a position of the terminals for the battery are adjusted.

6. An electronic device comprising the battery chamber according to claim 1.

7. An imaging device comprising the battery chamber according to claim 1.

8. The battery chamber according to claim 1, wherein the locking claw in the locking position abuts the back face of the battery from behind the back face in the insertion direction.

9. The battery chamber according to claim 8, wherein the back face is a surface of the battery which extends in a direction perpendicular to the insertion direction.

* * * * *